April 13, 1965 H. J. McCARRICK 3,178,529
MOTION-TRANSLATING DEVICE
Filed Jan. 2, 1963 2 Sheets-Sheet 1

Henry J. McCarrick,
Inventor.
Koenig, Pope, Senniger,
and Powers,
Attorneys.

April 13, 1965  H. J. McCARRICK  3,178,529
MOTION-TRANSLATING DEVICE
Filed Jan. 2, 1963  2 Sheets-Sheet 2

Henry J. McCarrick,
Inventor.
Koenig, Pope, Senniger and Powers,
Attorneys.

United States Patent Office 3,178,529
Patented Apr. 13, 1965

3,178,529
MOTION-TRANSLATING DEVICE
Henry J. McCarrick, Middleboro, Mass., assignor to Texas Instruments Incorporated, Dallas, Tex., a corporation of Delaware
Filed Jan. 2, 1963, Ser. No. 249,093
20 Claims. (Cl. 200—67)

This invention relates to motion-translating devices, and with regard to certain more specific features, to such devices having properties of large motion amplification whether made in creep-acting or snap-acting forms.

Among the several objects of the invention may be noted the provision of a motion-translating device having large amplification; the provision of such a device which in the snap-acting form will translate a small gradual movement into a comparatively large snap-acting movement; the provision of a device of the class described which is particularly adapted for operation of switches and more particularly miniature switches, although having more general uses; and the provision of a switch having a snap-acting element which is adapted to be manufactured at low cost by simple punching and stamping operations. Other objects and features will be in part apparent and in part pointed out hereinafter.

The invention accordingly comprises the elements and combinations of elements, features of construction, and arrangements of parts which will be exemplified in the constructions hereinafter described and the scope of which will be indicated in the following claims.

In the accompanying drawings, in which several of various possible embodiments of the invention are illustrated, FIG. 1 is a top plan view illustrating a first form of the invention;

Corresponding reference characters indicate corresponding parts throughout the several views of the drawings.

Figure 1:
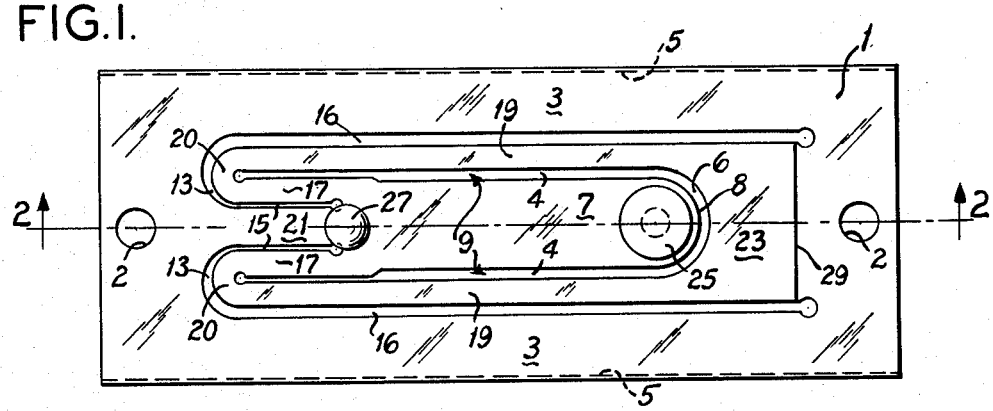

Referring now more particularly to FIG. 1, there is shown a plate 1, the total extent of which as raw material was initially in the form of a flat sheet of appropriately springy material and also of electrically conductive material for cases in which the device is to be used in electrical switching applications. As shown in FIG. 1, such a sheet has, according to the invention, been punched and formed to provide a finished one-piece element which is preferably symmetrical in shape relative to line 2—2. The element includes flat side portions 3 having longitudinal stiffening ribs 5, the device having endwise holes 2. At numeral 7 is shown a central tongue relieved from the remainder of the plate by a generally U-shaped slot 9. The slot 9 has a rounded bight portion 6 and side portions 4. It will be understood that the designation of a U-shape is intended to be broad, covering other shapes, such as V-shapes and the like.

At 13 are shown opposed curved generally J-shaped slots. These extend around the ends of the U-shaped slot 9. Each of slots 13 has a short leg or short inner extension 15 which are parallel to one another and interdigitate with the parallel sides 4 of slot 9, thus providing a central finger 21 integrally joined with tongue 7. The slot extensions 15, in conjunction with the ends of slot parts 4, also provide opposed legs 17. The legs 17 form a forked end on tongue 7. The other end 8 of the tongue 7 is free to move. The long legs, or longer extensions 16 of the J-shaped slots 13, in conjunction with slot portions 4 form parallel side arms 19. The side arms 19 are integrally connected to the legs 17 respectively by loop portions 20. The right-hand ends of the arms 19 (as seen in FIG. 1) are integrally connected at a junction 23 to form an integral connection between them and the right-hand end portion of the plate 1. Arms 19, together with the fork-forming legs 17 and junction 23, integrally join tongue 7 with the right-hand end portion of the plate, as seen in FIG. 1. The central finger 21 integrally joins tongue 7 with the left-hand end of the plate, as seen in FIG. 1. The tongue 7 may be provided near its free end with an electrical actuating projection, for example, in the form of a contact 25. A ball 27 is welded near the end of finger 21, where tongue 7 branches to form the forking legs 17.

It will be appreciated that not only may the U-shaped slot 9 be designated as such, as above mentioned, but each J-shaped slot likewise may be so designated. In the case of the slot 9, its limbs are of equal lengths, whereas in the case of the J-shaped slots the limbs are unequal. It will also be apparent that the loops of the slots 13 interdigitate with the ends of the sides of the slot 9.

Figure 2:
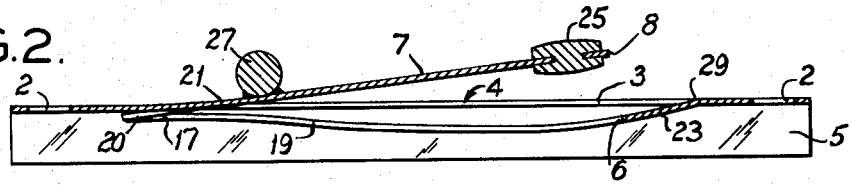
FIG. 2 is a longitudinal section taken on line 2—2 of FIG. 1.

To render the formed plate snap-acting, the portion 23 is deformed to direct arm 19 (either upwardly or downwardly) out of the plane of plate 1 as seen in FIG. 2 (the downwardly directed position having been selected and shown in FIG. 2 as illustrative). The bend line is shown at 29. Deforming portion 23 in this manner produces the effect of shortening the distance between loop portions 20 and bend line 29, which results in placing arms 19 and central fingers 21 in tension, with legs 17 and side portions 3 in compression. This pulls down legs 17 and rotates the central tongue 7 upwardly out of the plane of plate 1 as seen in FIG. 2. If portion 23 is initially moved upwardly instead of downwardly out of the plane of plate 1 (as seen in FIG. 2) tongue 7 and finger 21 will be located downward from the plane of plate 1 and parts 17, 19 and 20 upward. However, the respective conditions of compression and tension above described will remain the same as that described above for the reverse condition. In FIGS. 1 and 2 as shown, downward pressure on the ball 27 will cause tongue 7 first to move gradually toward the plane of plate 1 to approach a critical directional configuration of stresses in parts 17, 19 and 21, or a so-called over-centering position, beyond which tongue 7 snaps into a position below plate 1.

Figure 3:
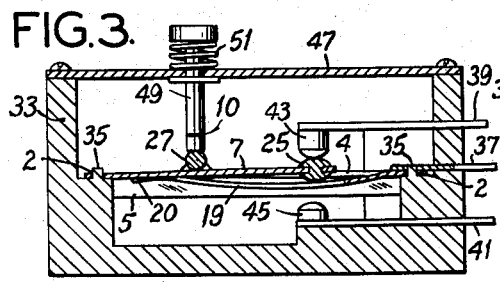
FIG. 3 is a section illustrating usefulness of the first form of the invention as a switch, said switch being shown in an initial position.

The device is shown in FIG. 3 as made up in the form of a switch. For this purpose it is provided with a suitably attached conductive terminal 37. The switch includes an insulating box or housing 33, having lugs 35 for insertion into the holes 2. The terminal 37 extends from the box through a suitable opening. Other terminals 39 and 41 extend from the box and are provided interiorly with contacts 43 and 45. Contacts 43 and 45 are so located that contact 25 may alternately engage therewith. The housing 33 has a cover 47, carrying a plunger 49 normally retracted by a spring 51. The outer end of plunger 49 is suitably electrically insulated from plate 1, as indicated at 10. The lower end of the plunger 49 is engageable with the ball 27. By pushing in the plunger shown in FIG. 4, the tongue 7 is rotated, after which a snap action occurs. This transfers contact 25 from contact 43 to contact 45. When the plunger 49 is released, return snap action occurs from the FIG. 4 to the FIG. 3 position. The location of contact 43 is such that the tongue 7 is initially depressed from its free position as shown in FIG. 2, nearly to the above-mentioned critical position nearer the plane of plate 1. This minimizes the amount of travel required of plunger 49 preliminary to snap action and also assures that contacts 25 and 43 will not open except by snap action. Return from the FIG. 4 to the FIG. 3 position occurs with snap action when pressure is released from the plunger 49.

Figure 4:
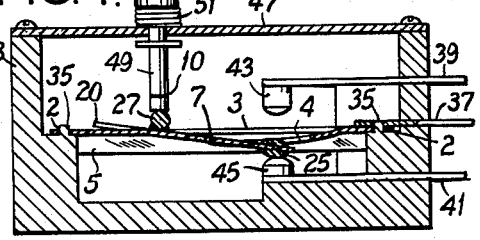
FIG. 4 is a view similar to FIG. 3, showing said switch in a second position.
Figure 5:
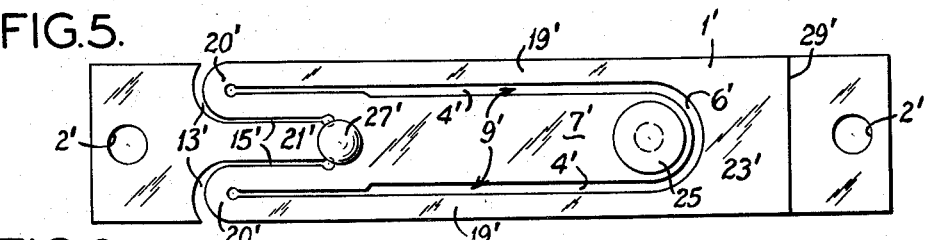
FIG. 5 is a view similar to FIG. 1, showing a second form of the invention.
Figure 6:
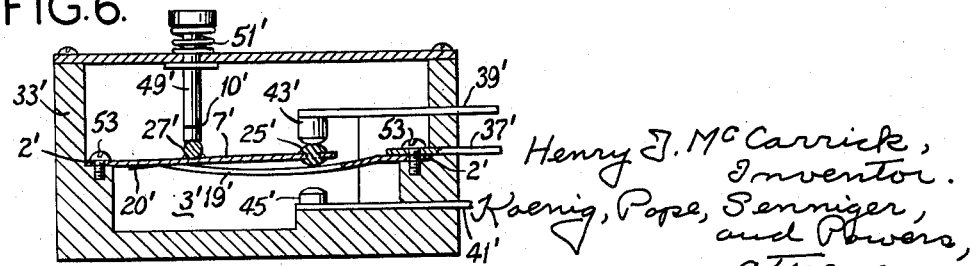
FIG. 6 is a view similar to FIG. 3, illustrating usefulness of the second form of the invention as a switch, shown in an initial position.

Referring to FIGS. 5 and 6, like numerals designate like parts to fit the above description, except that they are primed, all retained parts being the same as those already described, except that side portions 3, including their ribs 5, and the long legs 16 of J-shaped slots 13 are omitted. Therefore, further description will be unnecessary. The compression supplied by portions 3 in the forms of FIGS. 1 and 2 is in this form supplied by the switch casing 33' (FIG. 6). To accomplish this the holes 2' are so related to appropriately spaced anchoring screws 53 employed in the switch box that the side arms 19' are placed in tension. The reaction is then supplied by compressive stresses in the supporting parts of the casing 33'. Adjustment and operation in the case of FIGS. 5 and 6 are otherwise similar to those already described in connection with FIG. 4. However, in the form of FIG. 1 the compression parts 3 are integral with the remaining parts in a one-piece construction; whereas in the form of FIG. 6 the equivalent compression parts are supplied by the switch casing 33'. In the construction of FIG. 5 the parts under compression and tension are the same as that described above for the correspondingly unprimed numbered parts of the FIGS. 1 and 2 embodiment.

The snap-acting switch shown in FIGS. 3 and 4 may be classified as of the so-called automatic reset type. The motion-translating device is a so-called monostbale snap-acting element, i.e., it has only one position of inherent stability which is shown in FIG. 2. A position of relative instability is shown in FIG. 4. A characteristic of this monostable device is that it will automatically return from a position such as shown in FIG. 4 to the FIG. 3 position when the force-depressing plunger 49 is removed.

Figure 9:
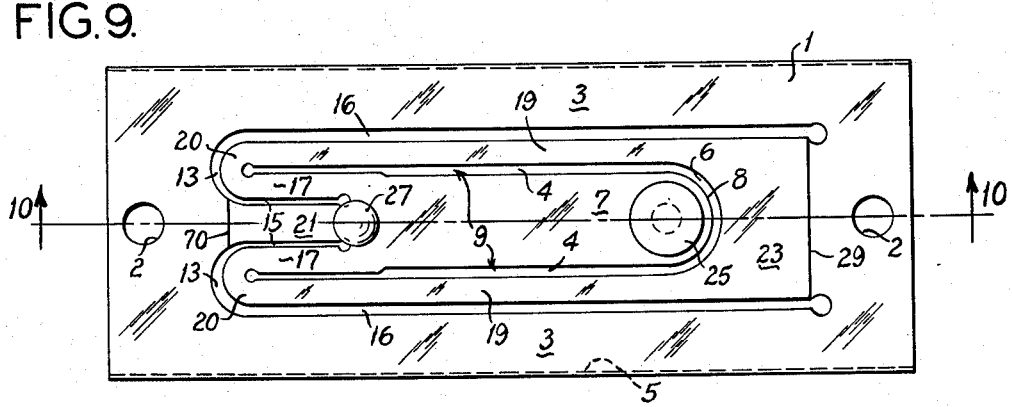
FIG. 9 is a view similar to FIG. 1, showing a fourth form of the invention.
Figure 10:
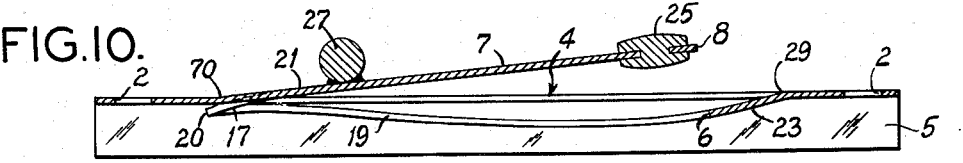
FIG. 10 is a longitudinal section taken on line 10—10 of FIG. 9.

The force urging the snap-acting member of FIG. 1 to return from the FIG. 4 to the FIG. 3 configuration can be increased by bending central finger 21 upwardly from the left-hand portion of the plate 1 as at 70, as best shown in FIGS. 9 and 10.

Figure 7:
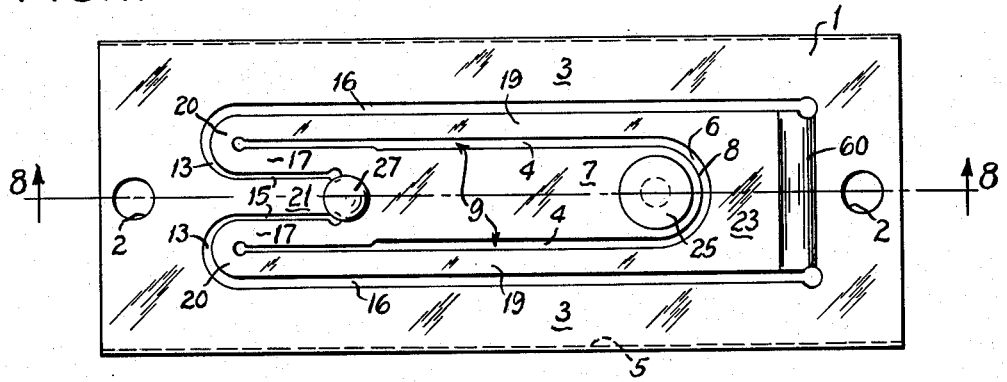
FIG. 7 is a view similar to FIG. 1, showing a third form of the invention.
Figure 8:
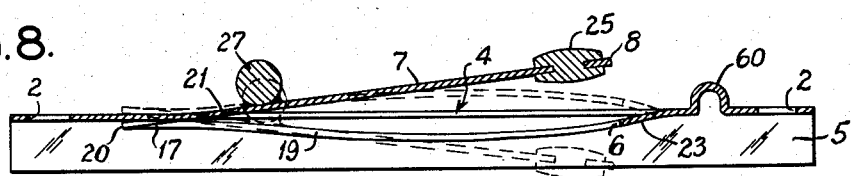
FIG. 8 is a longitudinal section taken on line 8—8 of FIG. 7, the dotted lines indicating alternate positions of parts.

The FIGS. 1 and 2 device can be rendered bistable by substituting a double band or crimp 60 for the single bend 29 of FIG. 1, as shown in FIGS. 7 and 8, wherein like numerals designate like parts. The crimp 60 has the effect of shortening the distance between the loop portions 20 and the crimp 60 so as to place arms 19 and central finger 21 in tension, with legs 17 and side portions 3 free in compression. This has the effect of forcing arms 19, finger 21 and central tongue 7 for movement to one side or the other of the central plane of the plate 1. Tongue 7 in this embodiment can thus take one of two stable positions which are on opposite sides of the plane of the plate 1 as may be seen from the solid- and dotted-line positions in FIG. 8. In this case an operating connection (not shown) is made with the ball 27, such that the ball may be pushed or pulled to either of the positions shown for attaining either of the two stable positions.

While the motion-translating device shown and described herein has been with reference to electrical switch applications, it will be understood that these devices may be used for other applications, for example, to operate valves, or in other mechanical or actuating applications. The advantage of large motion amplification (i.e., the distance ball 27 moves downwardly as seen in FIG. 2 relative to the distance which end 8 of tongue 7 moves downwardly on actuation) is provided by both the creep-acting and snap-acting forms of the invention. The device shown in FIGS. 1, 2, 5, 8 and 10 can be rendered creep-acting by omitting the bend lines or crimping. It will be understood that in all forms of the device the perimeter need not be rectangular and that other perimeter shapes may be employed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A motion-translating and -amplifying device comprising a plate having a generally U-shaped slot relieving an inner elongate tongue having a first and a second end, additional slot means interdigitating with the sides of the U-shaped slot forming sidewise legs flexibly supporting said first end of the tongue by certain end portions of said legs, said legs extending in a direction longitudinally of the tongue, said plate being formed with sidewise flexible connecting arms extending between respective portions of the other ends of the legs and a portion of the plate adjacent the second end of the tongue, said last-named portion of the plate being bent to force said arms out of the general plane of the plate.

2. A device according to claim 1, wherein said additional slot means has portions extending around the ends of the U-shaped slot.

3. A motion-translating and -amplifying element for use in a switch, comprising a plate having supporting means at opposite ends, the plate being slotted to relieve an inner tongue having a free end, also to form flexible side arms extending from one end of the plate, and to form flexible legs in looped connection with the side arms adjacent one end of said side arms, said legs connecting with the tongue toward its other end, said side arms having a junction therebetween adjacent the free end of said tongue, said junction being bent to force said side arms out of the general plane of the plate.

4. An element according to claim 3, wherein the bent junction is in the form of a crimp.

5. An element according to claim 3, including a contact on the free end of the tongue and a pressure-receiving member on and near the other end of the tongue.

6. An element according to claim 3, including comparatively nonflexible sidewise portions connecting opposite ends of the plate and separated from said arms.

7. An element according to claim 6, wherein said sidewise portions are provided with stiffening ribs.

8. A snap-acting switch comprising a plate having supporting means at opposite ends, a U-shaped slot relieving an inner tongue having a free end, additional slots extending into the tongue at its other end to provide sidewise legs extending from the tongue, each additional slot extending around one end of the U-shaped slot and substantially parallel thereto to form lateral arms, said arms being connected by a junction to one end of the plate adjacent the free end of the tongue and being crimped at said connection, sidewise portions connecting opposite ends of the plate outside of said arms, said additional slots also providing between said legs a connection between the tongue and the other end of the plate, said crimp causing said arms to be forced out of the general plane of the plate.

9. A snap-acting switch according to claim 8, wherein said sidewise portions are integral portions of the plate.

10. A snap-acting element comprising an elongate plate having supporting means at opposite ends, a U-shaped slot relieving an inner tongue having a free end, additional slots extending into the tongue at its other end to provide sidewise legs extending from the tongue, each additional slot extending around one end of the U-shaped slot and substantially parallel thereto to form lateral arms within side portions of the plate, said arms being connected to one end of the plate adjacent the free end of said tongue and being crimped at said connection, said side portions of the plate connecting opposite plate ends outside of said arms, said additional slots also providing between said legs a connection between the tongue and the other end of the plate, said crimp causing said arms to be forced out of the general plane of the plate.

11. A one-piece snap-acting element, comprising a symmetrically formed plate having a central U-shaped slot having sides of substantially equal lengths and relieving a central tongue having a free end, a pair of opposed J-shaped slots encompassing the ends of said first-named slot and having comparatively short leg portions extending into the tongue to form a central connecting member between the tongue and one end of the plate, and also forming legs extending from the tongue, said pair of J-shaped slots having comparatively long leg extensions which with the sides of the central U-shaped slot form side arms, said side arms being interconnected adjacent one end of each by a portion of the plate, said plate having connecting portions between its ends lying outside of said arms, and said plate portion being deformed to place said connecting member and side arms in tension and to place said legs and connecting portions of the plate in compression, whereby the tongue is forced out of the plane of the plate.

12. An element according to claim 11, wherein said connecting portions are ribbed, said tongue having a contact at its free end and an operating member located in proximity to its other end.

13. A motion-translating and -amplifying element for use in a snap-acting switch, comprising a plate having supporting means at opposite ends, the plate being slotted to relieve an inner tongue having a free end, also to form flexible side arms extending from one end of the plate, and to form flexible legs in looped connection with the side arms adjacent one end of said side arms, said legs connecting with the tongue toward its other end, said side arms being interconnected at their other ends by a portion of said plate adjacent a free end of said tongue, said portion of said plate being bent, thereby forcing said side arms to one side of the plane of said plate and to force said tongue to the other side of the plane of said plate.

14. A snap-acting switch comprising a plate having supporting means at opposite ends, a U-shaped slot relieving an inner tongue having a free end, additional slots extending into the tongue at its other end to provide sidewise legs extending from the tongue, each additional slot extending around one end of the U-shaped slot and substantially parallel thereto to form lateral arms, said arms being connected to one end of the plate adjacent the free end of the tongue and having a bend at said connection, sidewise portions connecting opposite ends of the plate outside of said arms, said additional slots also providing between said legs a connection between the tongue and the other end of the plate, said bend causing said arms and connection to operate in tension and to cause said legs and side portions to operate in compression.

15. A snap-acting element comprising an elongate plate having supporting means at opposite ends, a U-shaped slot relieving an inner tongue having a free end, additional slots extending into the tongue at its other end to provide sidewise legs extending from the tongue, each additional slot extending around one end of the U-shaped slot and substantially parallel thereto to form lateral arms within side portions of the plate, said arms being connected to one end of the plate adjacent the free end of said tongue and having a bend at said connection, said side portions of the plate connecting opposite plate ends outside of said arms, said additional slots also providing between said legs a connection between the tongue and the other end of the plate, said bend causing said arms and connection to operate in tension and to cause said legs and side portions to operate in compression.

16. A motion-translating and -amplifying device comprising a flexible plate having first and second ends and having a first U-shaped slot relieving an inner elongate tongue having a first restrained portion and a second free portion adjacent first and second ends of the plate, respectively, additional slots curved to extend around the ends of the first-named slot respectively and into the first end of said tongue to form a flexible supporting finger extending from the first end of the plate into and forming sidewise legs on said first end of the tongue, said plate being formed with sidewise flexible connecting arms extending between the ends of said sidewise legs at the first end of the tongue to its other end, a portion of the second end of the plate forming a junction between said arms and a portion of the first end of the plate supporting said finger said junction being bent to force said connecting arms out of the general plane of the plate.

17. A snap-acting switch comprising a plate having opposite ends, a switch body having spaced means connected with said opposite ends for spacedly supporting them, a U-shaped slot in the plate relieving from side portions of the plate, an inner tongue having a free end, additional slots extending from the sides of the plate and into the tongue at its other end to provide sidewise legs extending from the tongue, said additional slots also forming connections between said legs and said side portions of the plate, said additional slots also forming a central finger extending from the tongue to the end of the plate which is adjacent the ends of the U-shaped slot, the part of the plate adjacent the free end of the tongue being provided with a crimp to position said side portions out of the general plane of the plate.

18. A motion-translating and -amplifying device comprising a flexible plate having first and second ends and having a first U-shaped slot relieving an inner elongate tongue having a first restrained portion and a second free portion adjacent first and second ends of the plate, respectively, additional slots curved to extend around the ends of the first-named slot respectively and into the first end of said tongue to form a flexible supporting finger extending from the first end of the plate into and forming sidewise legs on said first end of the tongue, said plate being formed with sidewise flexible connecting arms extending between the ends of said sidewise legs at the first end of the tongue to its other end, a portion of the second end of the plate forming a junction between said arms, a portion of the first end of the plate supporting said finger, and a deformation at said junction locating said connecting arms out of the general plane of the plate in one direction.

19. A device according to claim 18, including extensions of said additional slots dividing said connecting arms from additional sidewise portions of the plate which form sidewise connections between said ends of the plate.

20. A device according to claim 19, including stiffening means in said additional sidewise portions of the plate.

References Cited by the Examiner
UNITED STATES PATENTS 2,697,145  12/54  Winet _____ 200—67

BROUGHTON G. DURHAM, Primary Examiner.

MILTON KAUFMAN, Examiner.